United States Patent
Seuss et al.

(10) Patent No.: US 10,581,235 B2
(45) Date of Patent: Mar. 3, 2020

(54) METHOD FOR AUTOMATICALLY COORDINATING PROTECTION SETTINGS IN AN ELECTRIC POWER DISTRIBUTION NETWORK

(71) Applicant: S&C Electric Company, Chicago, IL (US)

(72) Inventors: John Seuss, Chicago, IL (US); Yoav Sharon, Evanston, IL (US)

(73) Assignee: S&C Electric Company, Chicago, IL (US)

( * ) Notice: Subject to any disclaimer, the term of this patent is extended or adjusted under 35 U.S.C. 154(b) by 45 days.

(21) Appl. No.: 15/902,344

(22) Filed: Feb. 22, 2018

(65) Prior Publication Data

US 2019/0260196 A1     Aug. 22, 2019

(51) Int. Cl.
*H02H 3/08* (2006.01)
*G05B 19/048* (2006.01)
*H02H 1/00* (2006.01)

(52) U.S. Cl.
CPC .......... *H02H 3/08* (2013.01); *G05B 19/048* (2013.01); *H02H 1/0092* (2013.01); *G05B 2219/2639* (2013.01)

(58) Field of Classification Search
CPC ...... H02H 3/08; H02H 1/0092; G05B 19/048; G05B 2219/2639
See application file for complete search history.

(56) References Cited

U.S. PATENT DOCUMENTS

| 5,568,399 A | 10/1996 | Sumic |
| 6,985,784 B2 | 1/2006 | Vandevanter et al. |
| 2007/0286089 A1 | 12/2007 | Nasle et al. |
| 2009/0125158 A1* | 5/2009 | Schweitzer, III .. G01R 19/2513 700/293 |
| 2010/0161151 A1* | 6/2010 | Yang ....................... H02J 13/00 700/297 |
| 2011/0282507 A1* | 11/2011 | Oudalov .................. H04B 3/54 700/292 |
| 2013/0035885 A1* | 2/2013 | Sharon .................. G06F 17/509 702/61 |
| 2014/0203948 A1* | 7/2014 | Raskar ..................... H04L 1/00 340/870.02 |
| 2014/0207300 A1 | 7/2014 | Yun et al. |

OTHER PUBLICATIONS

Matthew Jennings Boecker et al.; Novel Approach to Relay Setting Development; Texas A&M Protective Relay Conference, College Station, Texas; Apr. 3-6, 2017; 11 pages.
The International Search Report and The Written Opinion dated Mar. 6, 2019 for the International Application No. PCT/US2018/066377. (7 pages).

* cited by examiner

*Primary Examiner* — Christopher E. Everett

(57) ABSTRACT

Methods and systems are provided for automatically coordinating protection settings for relays within an electrical power distribution network. A method includes using a graph traversal mechanism to analyze geographical-based equipment data that contains information about overcurrent relays within the electrical power distribution network. A customizable rule base is applied to protection guidelines. Protection settings are determined based upon the applied customizable rule base and the direction of fault current flow from each source. The determined protection settings are used for the overcurrent relays to control switches in the electrical power distribution network in response to a detected fault.

20 Claims, 6 Drawing Sheets

METHOD FOR AUTOMATICALLY COORDINATING PROTECTION SETTINGS IN AN ELECTRIC POWER DISTRIBUTION NETWORK

TECHNICAL FIELD

The present disclosure relates to electric power distribution systems, and more particularly, to an apparatus and method for coordinating overcurrent relays in electric power distribution networks.

BACKGROUND

This section provides background information related to the present disclosure, which is not necessarily prior art.

Electrical power distribution systems employ overcurrent relays that control the switches in the network to operate when a fault occurs. Some switches will be in series downstream of a source and need to coordinate their overcurrent relays such that only the switch closest to the fault operates.

Electric power distribution systems may also employ intelligent switching systems to automatically reconfigure the electrical network in the event of a fault to restore power to as many customers as possible. After network reconfiguration, overcurrent relays may be in series downstream of a different source and will need to coordinate with neighboring overcurrent relays again.

Several existing approaches use primary and alternate protection setting groups for the overcurrent relays when a switching event occurs. However, this approach is not scalable in that it does not address an arbitrary number of network reconfigurations. Additionally, selecting from pre-defined setting groups until no coordination issues occur does not provide the fastest protection possible, which is desirable when trying to reduce damage to utility equipment.

Accordingly, it is desirable to automatically coordinate protection settings for overcurrent relays in the event of a fault and network reconfiguration. It is also desirable to automatically coordinate protection settings for overcurrent relays that are geographically dispersed in a distribution network. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

In accordance with the present disclosure, apparatuses, systems, and methods are provided for automatically coordinating protection settings. Also disclosed are apparatuses, systems, and methods for using a network graph searching mechanism and data array structures with a heuristic protection setting module to automatically coordinate protection settings for overcurrent relays that are geographically dispersed in a distribution network.

Example embodiments will now be described more fully with reference to the accompanying drawings. There is no intention to be limited by any principle presented in the following detailed description.

Figure 1:
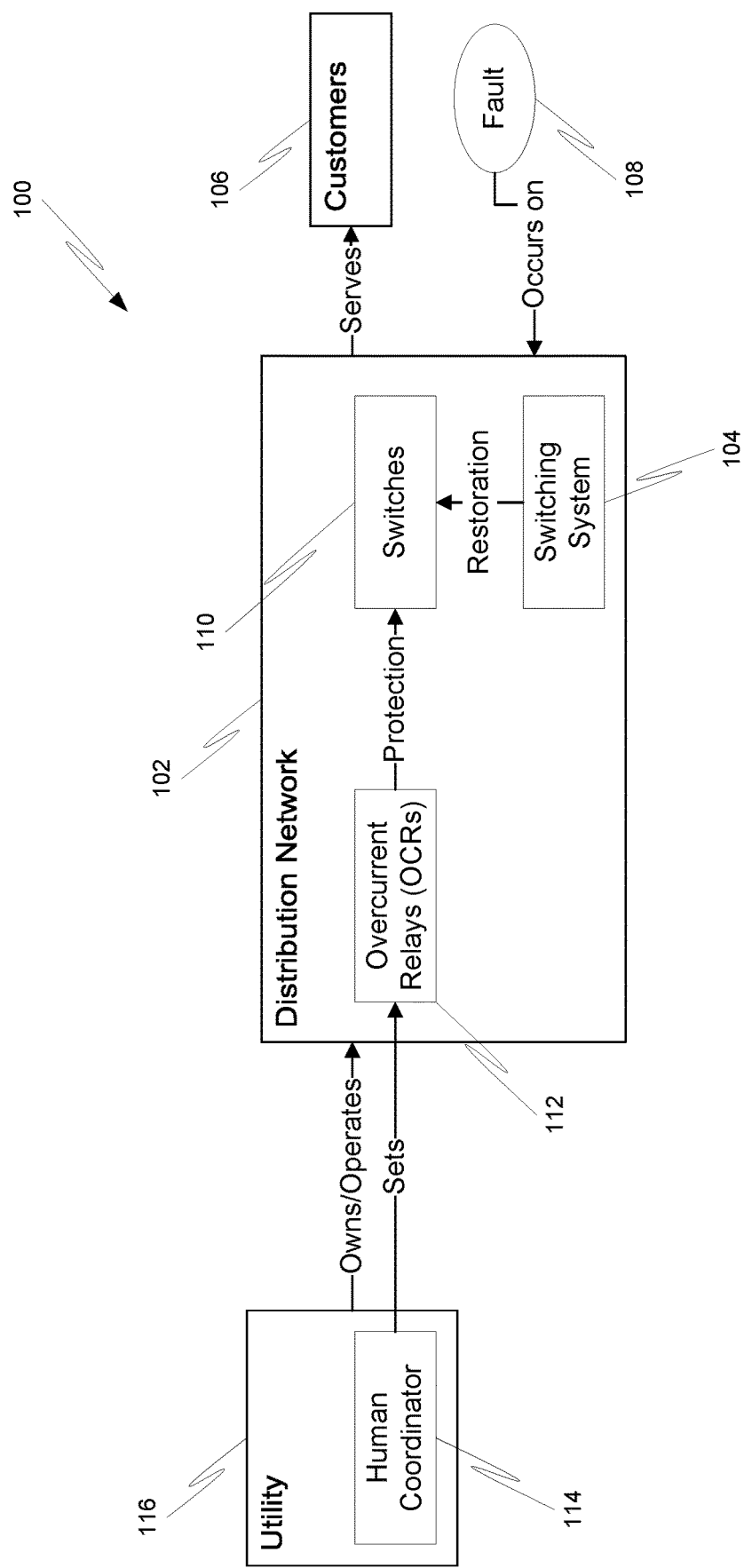
FIG. 1 is a process block diagram depicting a utility that operates an electrical power distribution system.

FIG. 1 depicts at 100 an electrical power distribution system 102 for delivering power to customers 106. A distribution utility company can install an intelligent switching system 104 to improve reliability of the electrical power distribution system 102. Such a switching system 104 can automatically reconfigure an electrical network to minimize the number of customers 106 without power following a fault 108.

In the event of a fault 108, the switches 110 that open first to de-energize the faulted section of the network should be the closest to the fault 108. This strategy can be achieved by a coordinator 114 that coordinates the overcurrent relay 112 (OCR), which operates the switch, with all other overcurrent relays 112 in the network. The switches 110 are coordinated such that the furthest switches from the transmission source open faster than switches closer to the source.

If the intelligent switching system 104 reconfigures the network, some switches 110 may be downstream of a different source and need to coordinate with a new set of overcurrent relays 112. Primary and alternate protection setting groups for the overcurrent relays 112 could be used when a switching event occurs. However, this alone is not sufficiently scalable in that it does not address an arbitrary number of network reconfigurations. Additionally, merely selecting from pre-defined setting groups until no coordination issues remain may not provide the fastest protection possible, which may be useful in reducing damage to utility equipment.

Figure 2:
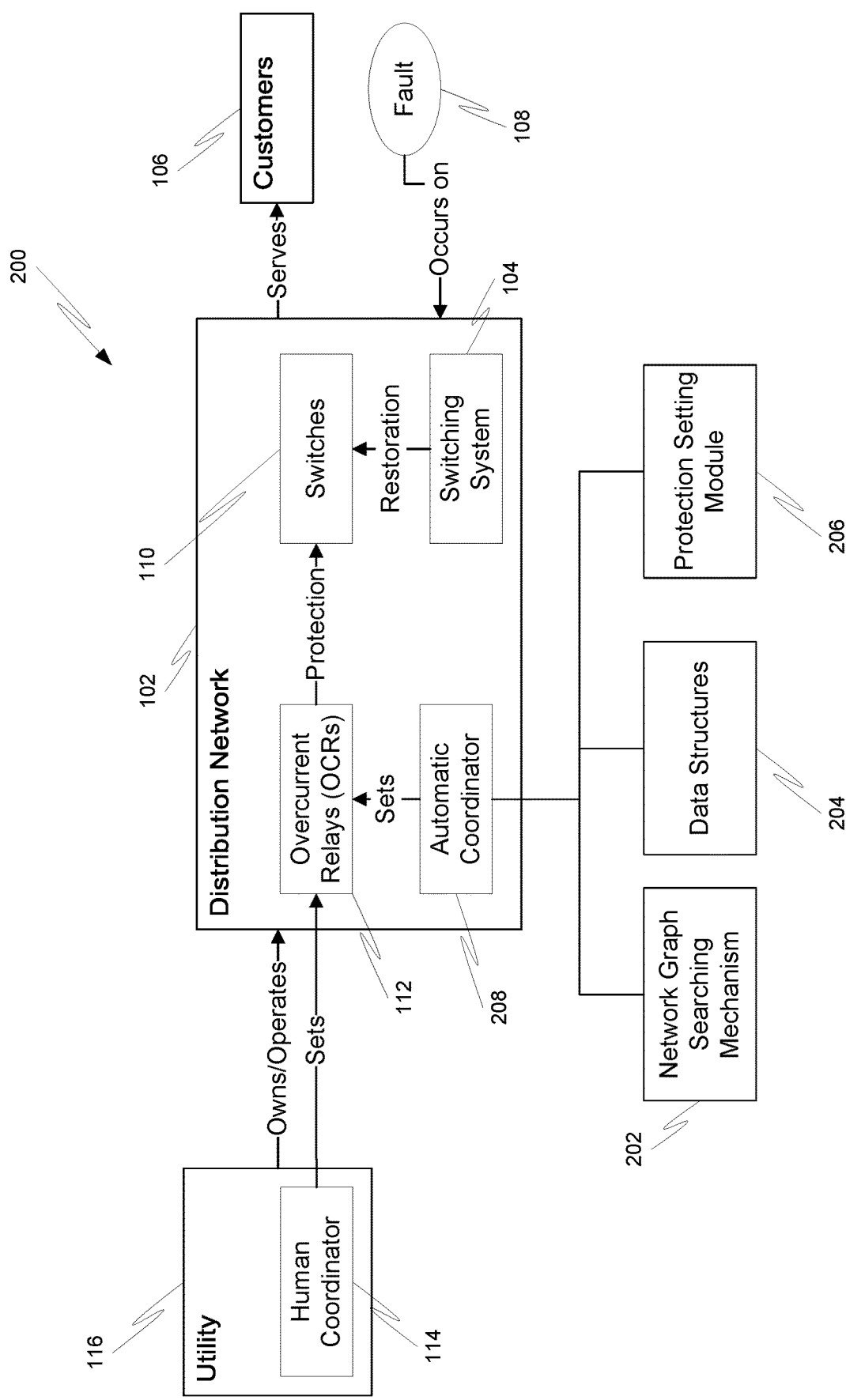
FIG. 2 is a process block diagram showing an automatic coordinator for setting overcurrent relays within an electrical power distribution network.

FIG. 2 depicts at 200 a coordinator 114 that automatically coordinates protection settings for overcurrent relays 112 that are geographically dispersed in the distribution system 102. The coordinator 114 is configured to provide scalability to an arbitrarily large number of network reconfigurations. In such a configuration, the coordinator 114 uses a network graph searching mechanism 202 and forms data structures 204 and determines optimum OCR settings through a rule-based protection setting module 206. Such a configuration at 200 can provide for minimization of protection device operating time across interconnected sections of network as well as provide the ability to set directional protection on overcurrent relays 112 in networks with multiple simultaneously connected sources.

Figure 3:
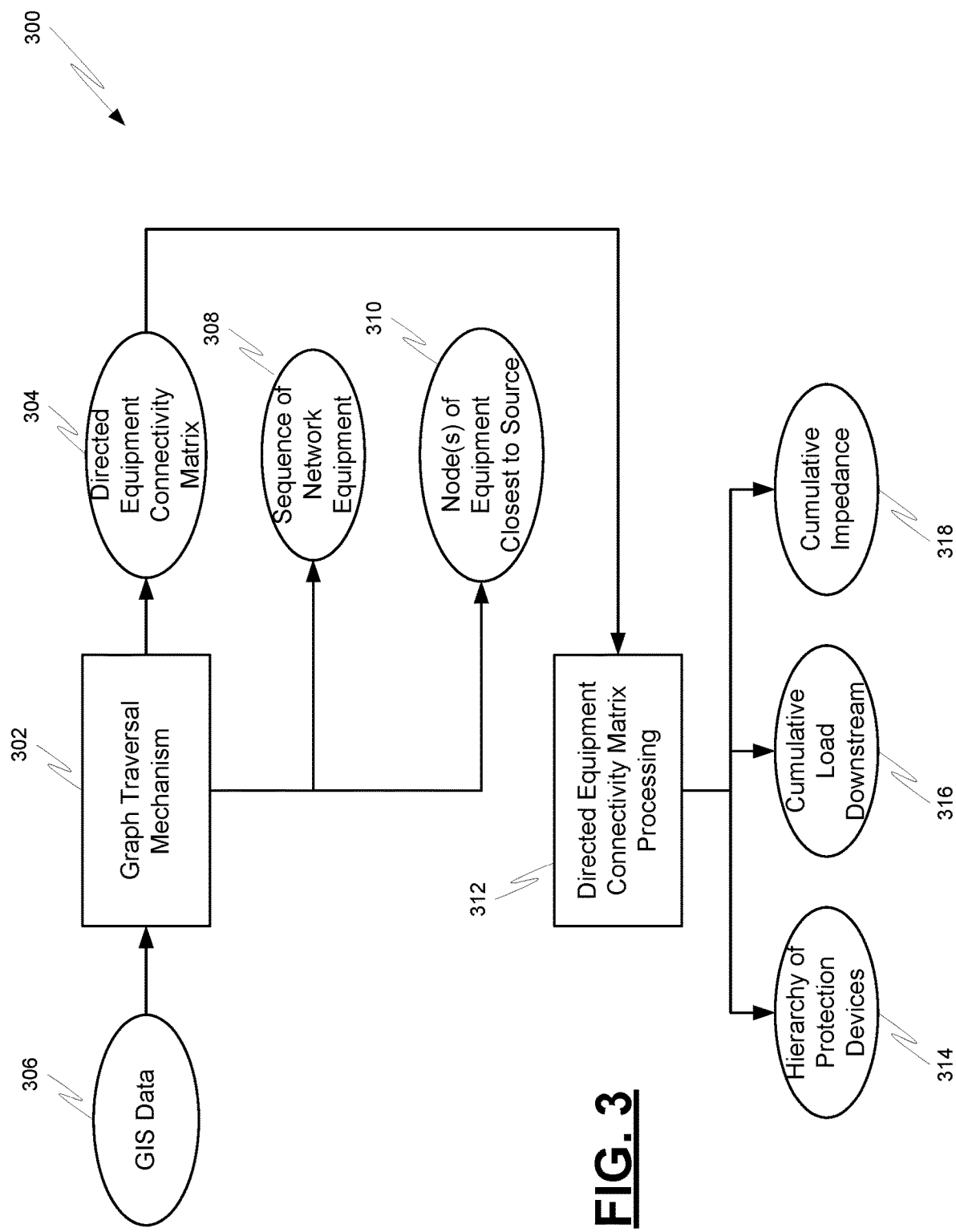
FIG. 3 is a flowchart depicting a graph traversal mechanism being used to collect and analyze geographic information system and equipment data.

FIG. 3 depicts at 300 application of a graph traversal mechanism 302 that creates a directed equipment connectivity matrix 304, or equivalent graph representation, from geographic information system (GIS) data 306. The input GIS data 306 can include location of the equipment in the network including fuses, reclosers, voltage regulators, capacitors, distribution transformers, and other protective or control devices. The GIS data can include additional information of the network equipment including ampacity, time-current curves, tap position, location of each pole, phase information, line impedance, distribution transformers sizing, etc. within the electrical network.

The graph traversal mechanism 302 identifies the sequence of network equipment 308 from the source in order to lower the computational burden of the upstream and downstream graph traversals (which are described with reference to FIG. 5). The graph traversal mechanism 302 further identifies the node of each piece of network equipment 310 closest to the source.

The directed equipment connectivity matrix 304 generated by the graph traversal mechanism 302 identifies at 312 the hierarchy of protection devices 314 with respect to a device's electrical distance from the source. The directed equipment connectivity matrix 304 is examined at 312 to identify the cumulative load downstream 316 of each network node as well as to identify the cumulative three-phase, unbalanced impedance 318 to each network node.

Figure 4:
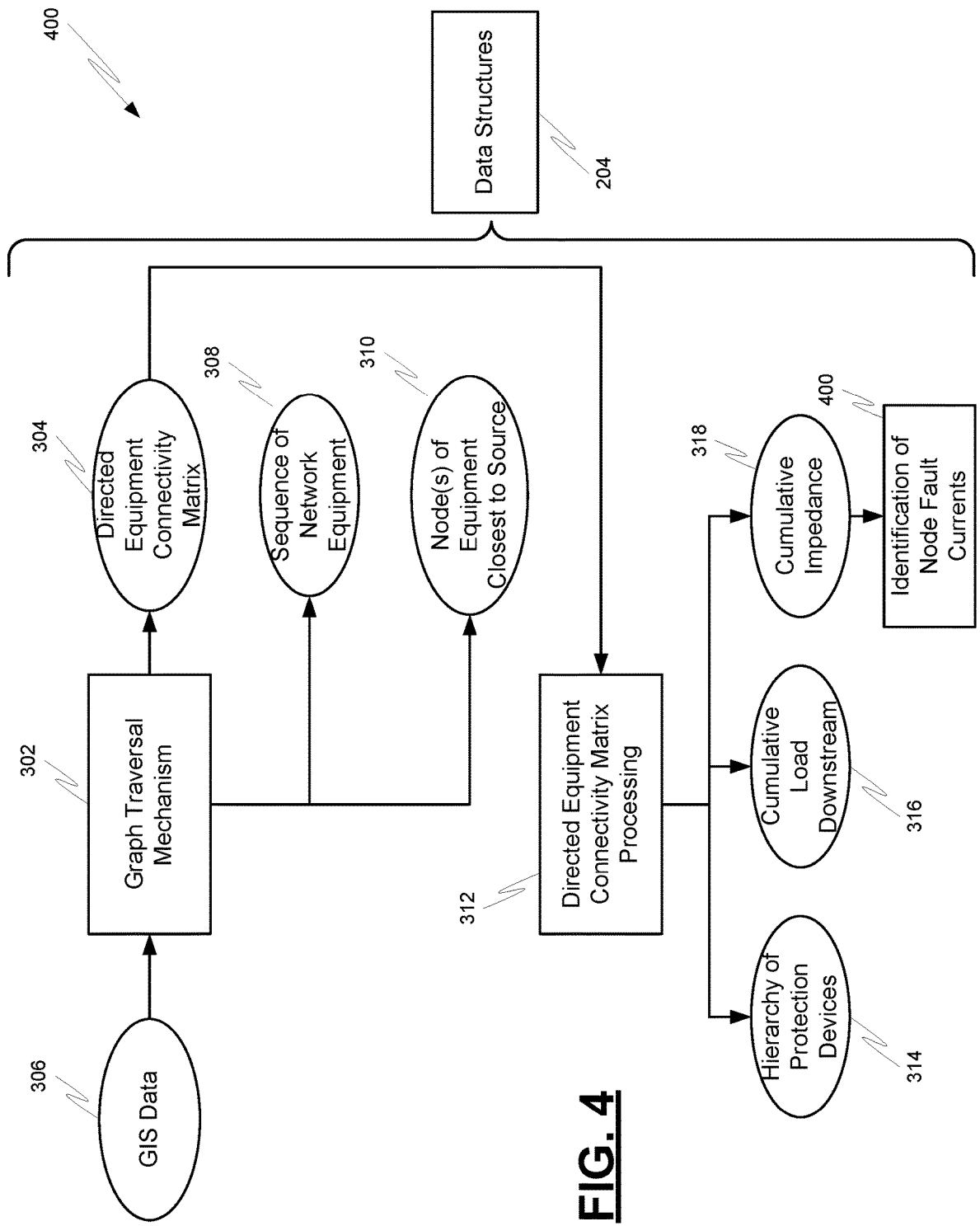
FIG. 4 is a flowchart depicting storage of node fault data and other information within data structures of the system.

With reference to FIG. 4, the cumulative impedance 318 derived from the directed equipment connectivity matrix 304 is used to identify at 400 the maximum available single-phase and three-phase fault current at each node in the network. The cumulative impedance as well as the directed equipment connectivity matrix 304, sequence of network equipment 308, and node(s) of equipment closest to the source 310 are stored in the data structures 204 in the form of data arrays for each source in the network. The data arrays are interlinked such that information in the data arrays can be combined by joining the interlinked fields in the data arrays. This can be used for automatic application of feeder circuit breaker and fuse protection based on network load properties.

Figure 5:
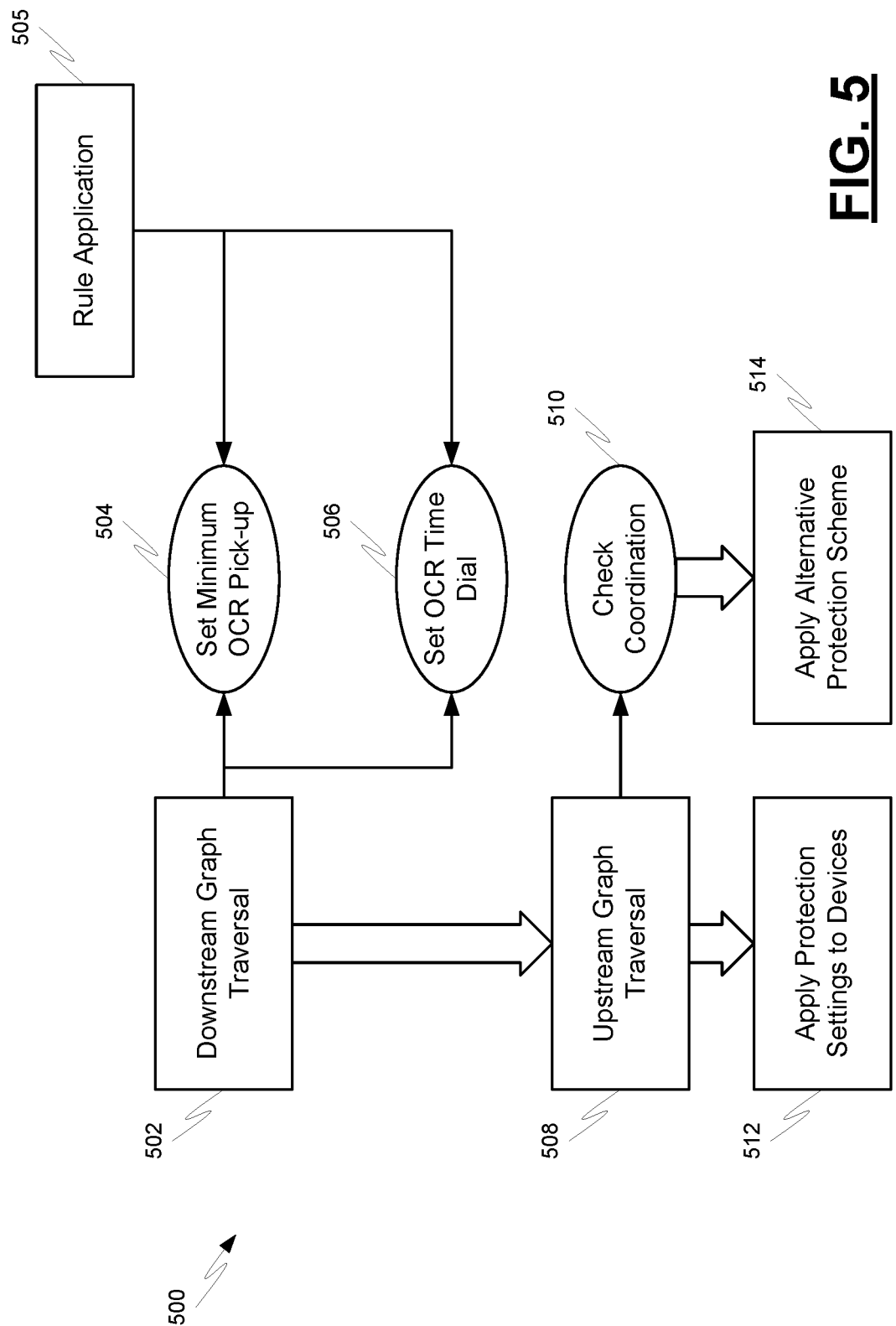
FIG. 5 is a flowchart depicting a coordination approach for applying protection schemes to coordinate devices to their maximum boundaries.

FIG. 5 shows at 500 a "slow" coordination preference process. Process 500 involves a downstream graph traversal mechanism 502 setting the minimum pick-up 504 of each overcurrent relay on the distribution line to be below the minimum pick-up of its upstream protection device or above some multiple of downstream load. The downstream graph traversal mechanism 502 also sets the time dial 506 of each overcurrent relay through an iterative testing of multiple currents uniformly distributed between the overcurrent relay's minimum pick-up and maximum available fault current. Other analytical methods may also be employed to determine a coordinated time dial setting. Rules are applied at process 505 in order to determine how the processing should handle certain situations. For example, a user can select whether the rules in a rule base apply to phase, ground, or negative sequence elements in the relay. Whereas phase overcurrent protection elements respond to a single-phase current magnitude, ground and negative sequence respond to a combination of all three phase current phasor measurements. During the coordination process, considerations are taken for the different protection elements. Each element has different maximum and minimum available fault current used in the coordination process. The negative sequence current measurement must be scaled when compared with phase current measurements. There can also be user-defined rules for how the different elements should coordinate with other phase overcurrent devices.

During the rule application process, the graph of network equipment between two devices being compared is used to determine if any additional current ratios should be applied, such as to account for current shifting due to transformer configuration.

The user may define additional rules to relays that allow the relays to attempt to operate faster than, or "save", a downstream fuse in the event that a fault is temporary and the system can be restored on subsequent reclosing attempts. There are different strategies for fuse-saving that the user can choose from. For example, the user may choose to let the relay operate as fast as possible or to operate just faster than a particular fuse. The user may also select whether the fuse-saving curve of a relay should attempt to coordinate with other neighboring fuse-saving curves.

Process 500 uses an upstream graph traversal mechanism 508 to check that the coordination settings 510 used by the downstream graph traversal mechanism 502 do not cause a coordination violation with any downstream protection devices. If the check passes with no coordination problems, then process 512 applies the settings to the devices. Otherwise, alternative protection schemes can be applied 514 when coordination with all neighboring devices is not possible. Process 514 can include a pulse-finding protection scheme. Pulse-finding is a protection method that allows relays to be mis-coordinated to a degree. Two or more devices may operate near the same time, and the pulse-finding method will close upstream devices back in and leave the device closest to the fault open. Communication enhanced coordination (CEC) can similarly allow many relays to be set to equal curves. Other schemes may be applicable provided that these methods are applied in the event that traditional coordination is not possible.

Figure 6:
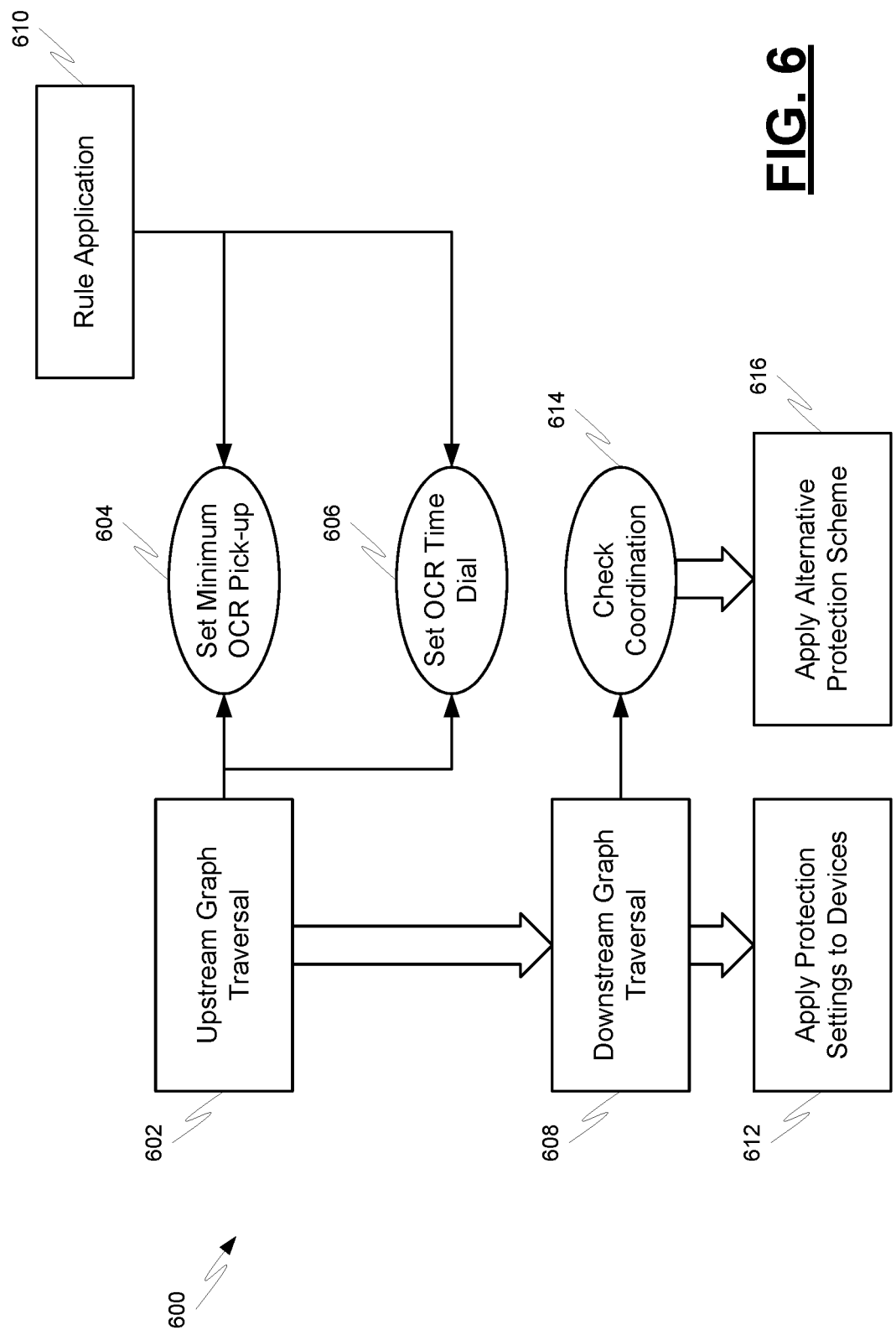
FIG. 6 is a flowchart depicting a coordination approach for applying protection schemes to coordinate devices to their minimum boundaries.

FIG. 6 shows a "fast" coordination preference approach. Fast coordination involves an upstream network traversal mechanism 518 that provides for minimization of overcurrent relay operation time 516. The upstream network traversal mechanism 518 does this by using a traversal to set the overcurrent relay minimum pick-up at 504 above the downstream protection pick-ups and a multiple of downstream load. Minimization of overcurrent relay operation time is also achieved at 516 by setting the time dial 520, during operation of the upstream network traversal mechanism 518, to be above the maximum clearing time of all downstream protection devices for a uniformly distributed set of fault currents.

Process 522 applies different types of protection elements, including phase overcurrent, ground overcurrent, etc. for setting the values at 504 and 516. Process 524 applies different, customizable rules for the different protection elements. This means that phase and ground may be set considering different neighboring devices and network properties. The result is such that ground and negative sequence settings may be automatically set to more sensitive constraints than phase settings, process 526. Furthermore, the rules can include that ground curves may operate faster than downstream fuses up to a multiple of the pick-up current. Processes 502 to 526 on FIGS. 5 and 6 are performed on each connected source in the network.

Fast coordination may also use a downstream graph traversal mechanism to check that the coordination settings used by the upstream graph traversal mechanism 518 do not cause a coordination violation with any upstream protection devices. If there are no coordination problems, then process 516 applies the settings to the devices. Otherwise, alternative protection schemes can be applied when coordination with all neighboring devices is not possible. These alternative protection schemes can include a pulse-finding protection scheme.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. As an example of the wide variations, a system and method can be configured as described herein for automatic generation of protection settings as part of an offline protection study as well as validation of existing protection settings compared with automatically generated settings. Additionally, a system and method can be configured to provide for automatic generation and setting of new protection settings for fielded relays that experience a network topology change.

As another example of the wide variation of the systems and methods described herein, operation of fuses in response to overcurrent can be based on their physical properties and may change based on ambient conditions or over multiple overcurrent events. The coordination approach can account for how ambient temperature and existing load current may cause a fuse to operate faster. The coordination method also can account for fuses exposed to reclosing shots not fully cooling and operating faster on subsequent reclose attempts.

As another example, the reclosing sequence can be defined for each device as a series of open intervals that the device waits between attempts to close back into a faulted line. Logic can also be specified to move the reclose shot counter even if the device did not operate. The user may specify that a particular set of rules applies to the initial tripping condition or any combination of reclosing attempts. The automatic coordination method then sets the time response curves of the relays based on the curves that will be active on neighboring devices at the same time.

The invention claimed is:

1. A method for automatically coordinating protection settings for relays within an electrical power distribution network, comprising:
using a graph traversal mechanism to analyze geographical-based equipment data that contains information about overcurrent relays within the electrical power distribution network;
applying a customizable rule base to protection guidelines;
determining protection settings based upon the applied customizable rule base and a direction of fault current flow from each source; and
using the determined protection settings for the overcurrent relays to control switches in the electrical power distribution network in response to a detected fault.

2. The method of claim 1, wherein a plurality of the switches is downstream of multiple different interconnected sources, including distributed generation.

3. The method of claim 1, wherein the determined protection settings facilitate coordinating protection settings for the overcurrent relays that are geographically dispersed in the electrical power distribution system;
wherein optimization is performed using valid protection settings based on a user-defined preference.

4. The method of claim 1, wherein the graph traversal mechanism identifies a network hierarchy of electrical equipment located within the geographically-dispersed distribution network and collects data to determine a response of equipment to fault current; and
utilizing the collected network data to determine fault current availability at each device based on equivalent impedance calculations and fault characteristics for use in a relay coordination process.

5. The method of claim 4, wherein the geographical-based equipment data contains properties of equipment in the electrical power distribution network including fuses, reclosers, voltage regulators, capacitors, distribution transformers, and conductors, wherein these properties at least include location, ampacity, rating, impedance, tap position, existing time-current curves, and pertinent control parameters.

6. The method of claim 1, wherein the analyzed geographical-based equipment data is stored in data arrays that are structured to contain directed equipment connectivity data, sequence of network equipment data, and data related to nodes of equipment closest to a source as related to each of a plurality of interconnected sources in a network.

7. The method of claim 1, wherein the customizable rule base includes rules that allow for the relays to not be coordinated at user-defined conditions;
wherein at least one of the rules specifies that ground curves operate faster than downstream fuses up to a multiple of a fuse minimum melt current.

8. The method of claim 1, wherein an upstream network traversal mechanism provides for minimization of overcurrent relay operation time;
wherein a downstream network traversal mechanism provides for maximization of overcurrent relay operation time.

9. The method of claim 1, wherein an advanced protection method is used in the event of a miscoordination;
wherein the advanced protection method includes a pulse-finding method or a communication enhanced coordination method.

10. The method of claim 1, wherein an upstream network traversal mechanism provides for minimization of overcurrent relay operation time by using a traversal to set the overcurrent relay minimum pick-up above the downstream protection pick-ups and a multiple of downstream load.

11. The method of claim 10, wherein the minimization of the overcurrent relay operation time is performed by setting a time dial during operation of the upstream network traversal mechanism.

12. The method of claim 1, wherein fuse size and speed is selected based on user-defined preferences.

13. The method of claim 1, wherein the customizable rules base includes rules to use different protection elements;
wherein the rules include coordinating ground protection elements up to a maximum single-phase-to-ground current.

14. The method of claim 13, wherein the rules include considering fuse pre-loading and effect of multiple reclosing attempts.

15. The method of claim 1, wherein relays are set to save downstream fuses in a coordinated manner based on the customizable rules base.

16. The method of claim 1, wherein the customizable rule base is customized so that different rules are applied to different reclosing shot attempts.

17. A system for automatically coordinating protection settings for relays within an electrical power distribution network, comprising one or more data processors to:

use a graph traversal mechanism to analyze geographical-based equipment data that contains information about overcurrent relays within the electrical power distribution network;

apply a customizable rule base to protection guidelines;

determine protection settings based upon the applied customizable rule base and a direction of fault current flow from each source; and use the determined protection settings for the overcurrent relays to control switches in the electrical power distribution network in response to a detected fault.

18. The system of claim 17, wherein a plurality of the switches is downstream of multiple different interconnected sources, including distributed generation.

19. The system of claim 17, wherein the determined protection settings facilitate coordinating protection settings for the overcurrent relays that are geographically dispersed in the electrical power distribution system;

wherein optimization is performed using valid protection settings based on a user-defined preference.

20. The system of claim 17, wherein the graph traversal mechanism identifies the network hierarchy of electrical equipment located within the geographically-dispersed distribution network and collects data to determine the response of equipment to fault current; and utilizing the collected network data to determine fault current availability at each device based on equivalent impedance calculations and fault characteristics for use in the relay coordination process.

\* \* \* \* \*